United States Patent [19]

Verberg

[11] Patent Number: 5,753,779
[45] Date of Patent: May 19, 1998

[54] CHROMIUM-FREE COATING PREPARATION FOR THE TREATMENT OF METAL SURFACES AND METHOD MAKING USE THEREOF

[75] Inventor: Johannes J.H. Verberg, IJssel, Netherlands

[73] Assignee: ADW Chemical Products B.V., Heijningen, Netherlands

[21] Appl. No.: 623,155

[22] Filed: Mar. 28, 1996

[30] Foreign Application Priority Data

Apr. 11, 1995 [NL] Netherlands .................. 1000118

[51] Int. Cl.$^6$ ............................................. C08F 8/32
[52] U.S. Cl. ................ 525/369; 525/329.9; 525/371; 525/372; 525/384; 428/461
[58] Field of Search ........................ 525/369, 371, 525/372, 384; 428/461

[56] References Cited

U.S. PATENT DOCUMENTS

| | | | |
|---|---|---|---|
| 3,959,237 | 5/1976 | Blank | 525/330.2 |
| 5,270,376 | 12/1993 | Matejcek et al. | |
| 5,374,687 | 12/1994 | Cooperman et al. | 525/330.2 |

FOREIGN PATENT DOCUMENTS

| | | |
|---|---|---|
| 0442370 | 8/1991 | European Pat. Off. |
| 0455379 | 11/1991 | European Pat. Off. |
| 0587332 | 3/1994 | European Pat. Off. |
| 1051436 | 2/1959 | Germany |
| 1000118 | 4/1995 | Netherlands |
| 9315154 | 8/1993 | WIPO |

OTHER PUBLICATIONS

Chemical Abstracts, vol. 84, No. 10, Mar. 8, 1976, Columbus, Ohio, United States, Abstract No. 61387, Kuboko Paint KK, Water–Thinned Thermosetting Resin Coating Compositions.

Chrmical Abstracts, vol. 83, No. 6, 11 Aug. 1975, Columbus, Ohio, US; abstract No. 50778, "Photorecording Material" p. 497; XP002006467 *abstract* & JP–A–49 033 654 (Canon KK).

Patent Abstracts of Japan, vol. 16, No. 25 (C–903) & Jp–A–03 237172 (Yushiro Chem Ind KK) *abstract*.

Primary Examiner—Bernard Lipman
Attorney, Agent, or Firm—Brooks & Kushman P.C.

[57] ABSTRACT

An aqueous chromium-free coating preparation for the protection of a metal substrate against corrosion and attack by moisture comprises an acrylic acid or derivative thereof as binder and also a crosslinking system which comprises at least one hydroxide of a divalent metal ion and an amine compound. The acrylic acid:crosslinking system ratio is generally 1.5–4:2–4. The crosslinking system may comprise other monofunctional or polyfunctional compounds. Various constituents of the crosslinking system can be interchanged within certain margins.

19 Claims, No Drawings

CHROMIUM-FREE COATING PREPARATION FOR THE TREATMENT OF METAL SURFACES AND METHOD MAKING USE THEREOF

TECHNICAL FIELD

The invention relates to an aqueous chromium-free coating preparation for the treatment of metal surfaces, in particular for the pretreatment thereof. Chromium-free coating preparations are known in the coating industry and are used as coating for metal packagings in the foodstuffs industry.

BACKGROUND OF THE INVENTION

Metals generally tinplate and aluminium, which are used as packaging material, for example cans and tins, in the foodstuffs industry are generally pretreated in order to obtain on the metal a lacquer adhesion which is such that the lacquered surface remains intact or sealed after a generally used deep-drawing operation which takes place in order to deform the lacquered plate to form a rectangular or cylindrical packaging.

During a subsequent exposure to moisture, such as, for example, during the sterilization of the final product, or during an exposure to acid due to the packaged foodstuffs, no deterioration of the lacquer adhesion or attack on the metal should occur.

In connection with these severe deformations, thin layers are required for this purpose, dry layer weights preferably varying from 50 to 150 mg/m$^2$ of treated surface.

For this purpose, chromium-containing coating preparations were generally used which impart the desired properties to the packaging material. Because the coatings obtained with these preparations contained chromium, there was the risk that the chromium got out of the coating into the foodstuff, which is undesirable from the point of view of the health of the user, whether human or animal. If they get into the foodstuff, chromium compounds or chromium-containing compounds are generally harmful to the health of the consumer of the foodstuffs, but they can also adversely effect the durability of the packaged foodstuffs. To reduce the harmfulness of such coating layers, chromium-free coating preparations have also been proposed in which the chromium was replaced by other heavy metals or compounds, for example by Ti, V, Zr, Sr. The adhesion properties and the chemical resistance of these chromium-free preparations are, however, less than those of the chromium-containing coating preparations. In addition, said chromium-free preparations are also harmful to the health of the consumer because of the heavy metals present therein.

From DE-B-1 051 436 a resin dispersion for coating substrates, e.g. wood, metal and paper, is known, which dispersion contains a lower alkylester of (meth)acrylic acid together with 0.25 to 25 mole percent of acrylic, methacrylic or itaconic acid, using a crosslinking system based on an alkaline compound of a polyvalent metal in an amount of 0.125 to 12.5 mole percent. Such a dispersion is said to be less harmful to the health. No indication of the corrosion resistance of a coating obtained from this dispersion, is presented, because the examples are mainly directed to paper substrates.

From EP-A-0 624 182 a so called auto deposition coating composition is known. This composition having a pH ranging from about 1.6 to about 5 comprises a film forming component like acrylic resins, fluoride ions, and at least metal ions selected from zinc, cobalt, manganese, nickel, iron and aluminium and as fourth component tungstate ions and/or molybdate ions. This known composition is less suitable for application to substrates to be subjected to a deep-drawing operation because the applied amount is too high to obtain the thin layers required in view of the deep-drawing operation.

The object of the present application is to provide a coating preparation which does not have the abovementioned disadvantages, the protective function of the coating being maintained.

SUMMARY OF THE INVENTION

The aqueous chromium-free coating preparation according to the invention comprising acrylic acid or a derivative thereof as binder and a crosslinking system is characterized in that the crosslinking system comprises at least one hydroxide of a divalent metal and an amine compound.

The aqueous coating preparation according to the invention, which is suitable, in particular, for use on metals for the foodstuffs industry, does not contain chromium or chromium compounds and is therefore safer on the basis of health considerations than the known chromium-containing coating preparations, while the properties thereof, specifically the layer thickness, lacquer adhesion and resistance to attack by moisture and chemical effects are comparable with those of the chromium-containing coating preparations and are therefore better than those of the known chromium-free coating preparations. Because of these excellent properties, the preparation according to the invention is widely usable for forming a thin conversion layer on metal substrates.

As has already been stated above, the coating preparation according to the invention can be used, in particular, for the protection of metal packaging material. Other advantageous application areas are use in transparent lacquer systems because the lacquer layer formed is colourless, use in the automobile industry on metal components, where a chromium-free or chromate-free surface is required or desirable in connection with subsequent treatments, for example grinding operations, and also use as transparent final layer on the metal, in particular aluminium to protect against attack and corrosion. In these applications, the preparation also gives an improved lacquer adhesion and protection against moisture and corrosion. The weight of the layer formed with the preparation according to the invention is less critical in these latter applications because no deep-drawing operation takes place and consequently the layer weight is preferably between 150 and 500 mg/m$^2$.

DETAILED DESCRIPTION OF THE INVENTION

The preparation according to the invention contains, as one of the main constituents, acrylic acid or a derivative thereof, preferably in an amount of 2–8% by weight, based on the total weight of the preparation in the application phase. The preparation according to the invention can also be produced in higher concentrations, after which it is diluted with water by the user to the desired concentration. In view of the transport costs of the product, this is an economically attractive variant. Said acrylic acid, for example polyacrylic acid, functions as binder in the preparation according to the invention. In addition, the preparation contains a crosslinking system for the acrylic acid or derivative thereof, which contains at least one hydroxide of a divalent metal and an amine compund.

The acrylic acid:crosslinking system ratio will vary as a function of the amount used of the constituents of the crosslinking system but is in the order of magnitude of 1.5–4:2–4. If the acrylic acid is crosslinked to a high degree, the protective layer is too hard. If the degree of crosslinking is low, the protective layer will be sticky and difficult to dry.

The crosslinking system, which contains at least one hydroxide of a divalent metal and an amine compound, may also contain other compounds having crosslinking action, such as a monofunctional or polyfunctional reactant, in order to obtain the desired degree of crosslinking. Examples of suitable reactants in this respect comprise, for example, organic acids. The various reactants may be interchanged with one another within certain limits, depending on the desired physical properties of the coating layer formed. Such a composite crosslinking system contains compounds having a different number of functional groups for crosslinking of acrylic acid. Preferably the amine compound e.g. alkanolamine is a trialkanolamine, which has three crosslinking functional groups. Preferred other organic acids are mono acids. Thus a preferred combination of constituents of the crosslinking system comprises compounds having one, two and three crosslinking functional groups respectively, being a mono acid, a hydroxide of a divalent metal and a trialkanolamine respectively.

Suitable materials derived from acrylic acid are, inter alia, polymers, such as polyacrylates, and resins. Preferably the acrylic acid derivative used is an acidic resin thereof.

Preferably, the divalent metal ion is chosen from the group of metals which comprises the alkaline-earth metals and zinc. Barium hydroxide, calcium hydroxide and strontium hydroxide are suitable examples thereof. However, barium hydroxide is preferred in particular because the corrosion resistance obtained therewith is excellent in comparison with that of the known systems. Furthermore, any residual amount of barium reacts with sulphate, which is present in most foodstuffs, to form barium sulphate. This is a very sparingly soluble compound which is not harmful to the health of the consumer.

Depending on the nature of the substrate to be coated, the coating preparation according to the invention may furthermore contain a fluoride source which etches the metal, as a result of which the adhesion of the preparation to the metal may be improved. Other conventional additives, for example bactericides, fillers and detergents, may also be present in the preparation.

The pH of the coating preparation is not critical, but is generally less than 6.

A preferred composition of the preparation according to the invention contains 0.75–0.85% by weight of barium hydroxide, 8–12% by weight of acrylic acid, 1.5–2.0% by weight of triethanolamine, 1.0–2.0% by weight of formic acid and 0.01–0.3% by weight of detergent.

A preferred composition of the preparation for use on substrates which are difficult to treat contains, in addition to the compounds stated above and quantities thereof, 0.06–0.14% by weight of fluorides. Such a preparation is used, for example, in the case of relatively passive aluminium alloys etc.

The coating preparations according to the invention can be produced in the conventional manner. A preferred embodiment of the production method comprises the mixing of a suitable aqueous solution of acrylic acid or a derivative thereof with a suitable amount of hydroxide of a divalent metal in solid form, the temperature being kept between 20° and 80° C., after which the other constituents are added to the aqueous dispersion obtained in the desired amounts. In the case of this method, the temperature is critical because the acrylic resin or derivative thereof cures at unduly low or unduly high temperature. With this method, a higher acrylic concentration can be obtained in the aqueous solution than if a hydroxide solution is mixed with an acrylic acid dispersion.

The invention also relates to a method for the treatment of metal surfaces with the aid of the coating preparation according to the invention, and also to the substrates obtained by the method. Usually, the layer weight will be in the 25–500 mg/m$^2$ range, the lower range being preferred for use in the food industry. In the case of strongly pigmented preparations, the layer weight may rise to approximately 4000 mg/m$^2$, depending on the pigment concentration.

The invention is explained below with reference to the following example.

EXAMPLE

A coating preparation according to the invention (Primecoat CR-free) was produced in a conventional manner by mixing the component constituents.

| Amount kg/100 kg | Raw material |
| --- | --- |
| 84.5 | Demineralized water |
| 1.5 | Formic acid, 85% |
| 2.0 | Triethanolamine |
| 0.8 | Barium hydroxide |
| 11.0 | Neocryl W-1220 (acrylate resin 25%) |
| 0.1 | Fluoride |
| 0.1 | Detergent |

The composite crosslinking system imparts a degree of crosslinking X to the coating preparation. The degree of crosslinking of other preparations according to the invention, in which the constituents of the crosslinking system are varied, should be in the 0.9 X–1.1 X range.

A number of tests have been carried out with the preparation obtained in this way and other coating preparations obtainable commercially in order to investigate and to analyse the expediency of the protective action.

An aluminium substrate (5050 H26) having a thickness of 0.46 mm was degreased in all cases with a cleaning agent (AD Cleaner Z-19 D) based on phosphoric acid for 20 sec at a temperature of 55° C. and then rinsed. After this pretreatment, the degreased substrate was dried for 5 sec in an oven at a temperature of 140° C.

In all cases, an HCI polyester lacquer crosslinked with melamine which is generally used for the lacquering of slats for blinds by the coil coating method was used as top layer. The dry layer thickness of the top layer was 16 micrometers. The stoving was carried out for 24 sec at a stoving temperature of 295° C., which resulted in a PMT of 235° C.

The following coating systems have been used. In coating system A, no conversion layer, but only the top layer was applied. In coating system B, the aluminium was treated with a yellow chromating system (AD Chromate 12) which is specifically intended for the treatment of aluminium for uses other than for the foodstuffs industry. The layer weight thereof was approximately 180 mg/m$^2$. In coating system C, the aluminium was treated with a green chromating system (AD Chromate 43) which is intended for use in can coating. The layer weight thereof was approximately 100 mg/m$^2$. In the case of coating system D, a conversion layer was used which has been obtained with the coating preparation according to the invention (Primecoat CR-free).

24 hours after the lacquering of the substrates, they are subjected to a number of standard tests to investigate the adhesion properties, the resistance to moisture and corrosion. The results thereof are shown in Table 1.

TABLE 1

Test results of aluminium after 24 hours.

| SYSTEM | ADHESION AREA ON SQUARES | IMPACT | ADHESION ON BENDING | | |
|---|---|---|---|---|---|
| | | | T0 | T2 | T4 |
| A | 6 | 3 | 0 | 0 | 3 |
| B | 9 | 10 | 6 | 7 | 10 |
| C | 7 | 6 | 4 | 4 | 10 |
| D | 10 | 10 | 8 | 10 | 10 |

Standard tests are also carried out after 2 hours boiling in demineralized water and 1 hour recovery at room temperature, and also after carrying out a moisture test lasting 1000 hours and after carrying out a salt/acetic acid treatment (SAS) lasting 500 hours, in which a cross-cut incision was made in the lacquer. The results of these tests are shown in Tables 2–4.

TABLE 2

Test results of aluminium after 2 hours boiling in demineralized water.

| SYSTEM | ADHESION AREA ON SQUARES | IMPACT | ADHESION ON BENDING | | |
|---|---|---|---|---|---|
| | | | T0 | T2 | T4 |
| A | 0 | 0 | 0 | 0 | 0 |
| B | 7 | 9 | 4 | 5 | 10 |
| C | 3 | 4 | 1 | 3 | 10 |
| D | 10 | 10 | 7 | 10 | 10 |

TABLE 3

Test results of aluminium after 1000 hours moisture treatment.

| SYSTEM | RESULTS |
|---|---|
| A | OVERALL BLISTERING AND PEELING |
| B | SLIGHT SOFTENING OF THE LACQUER |
| C | SLIGHT TO MODERATE SOFTENING OF THE LACQUER |
| D | NO ALTERATION |

TABLE 4

Test results of aluminium after 500 hours salt/vineqar treatment.

| SYSTEM | SCRATCH ASSESSMENT | FILLIFORM CORROSION | NOTES |
|---|---|---|---|
| A | 0 | 3.5 | BLISTERS ON SURFACE |
| B | 4 | 1.5 | |
| C | 8 | 0.5 | |
| D | 8 | 0.5–1.0 | |

What is claimed is:

1. Aqueous chromium-free coating preparation for the treatment of metal surfaces, in particular for pretreatment thereof, the preparation comprising an acidic polyacrylate polymer as binder and a crosslinking system, wherein the crosslinking system comprises at least one hydroxide of a divalent metal and an amine compound.

2. Coating preparation according to claim 1, wherein the amine of the crosslinking system is an alkanolamine, preferably a trialkanolamine.

3. Coating preparation according to claim 2, wherein furthermore the crosslinking system comprises an organic mono acid, other than acrylic acid.

4. Coating preparation according to claim 1, wherein the acidic polyacrylate polymer: crosslinking system ratio is 1.5–4:2–4.

5. Coating preparation according to claim 1, wherein the acidic polyacrylate polymer is present in an amount of 2–8% by weight, based on the total weight of the preparation in the application phase.

6. Coating preparation according to claim 1, wherein the divalent metal is chosen from the group of metals which comprises alkaline-earth metals and zinc.

7. Coating preparation according to claim 6, wherein the divalent metal is barium.

8. Coating preparation according to claim 1, wherein the preparation contains 0.75–0.08% by weight of barium hydroxide, 2–3% by weight of acidic polyacrylate polymer, 1.5–2.0% by weight of triethanolamine, 1.0–2.0% by weight of formic acid and 0.001–0.3% by weight of detergent.

9. Coating preparation according to claim 8, wherein the preparation contains 0.06–0.14% by weight of fluoride.

10. A metal surface which has been rendered resistant to corrosion, said metal surface coated with a cross-linked coating which prior to crosslinking comprises the aqueous, chromium-free coating preparation of claim 1.

11. A metal surface which has been rendered resistant to corrosion, said metal surface coated with a cross-linked coating which prior to crosslinking comprises the aqueous, chromium-free coating preparation of claim 2.

12. A metal surface which has been rendered resistant to corrosion, said metal surface coated with a cross-linked coating which prior to crosslinking comprises the aqueous, chromium-free coating preparation of claim 3.

13. A metal surface which has been rendered resistant to corrosion, said metal surface coated with a cross-linked coating which prior to crosslinking comprises the aqueous, chromium-free coating preparation of claim 4.

14. A metal surface which has been rendered resistant to corrosion, said metal surface coated with a cross-linked coating which prior to crosslinking comprises the aqueous, chromium-free coating preparation of claim 5.

15. A metal surface which has been rendered resistant to corrosion, said metal surface coated with a cross-linked coating which prior to crosslinking comprises the aqueous, chromium-free coating preparation of claim 6.

16. A metal surface which has been rendered resistant to corrosion, said metal surface coated with a cross-linked coating which prior to crosslinking comprises the aqueous, chromium-free coating preparation of claim 7.

17. A metal surface which has been rendered resistant to corrosion, said metal surface coated with a cross-linked coating which prior to crosslinking comprises the aqueous, chromium-free coating preparation of claim 9.

18. A metal surface which has been rendered resistant to corrosion, said metal surface coated with a cross-linked coating which prior to crosslinking comprises the aqueous, chromium-free coating preparation of claim 10.

19. Method for the production of a coating preparation comprising an acidic polyacrylate polymer as binder and a crosslinking system, which system comprises at least one hydroxide of a divalent metal and an amine, wherein a suitable aqueous solution of an acidic polyacrylate polymer is mixed with a suitable amount of the hydroxide of the divalent metal in solid form in order to obtain an aqueous dispersion, the temperature being kept between 20° and 80° C., after which the amine compound and optionally other constituents, are added to the aqueous dispersion obtained in suitable amounts.

* * * * *